Sept. 6, 1966 A. J. LEWUS 3,271,646
CONVERTER SYSTEMS
Original Filed June 14, 1961
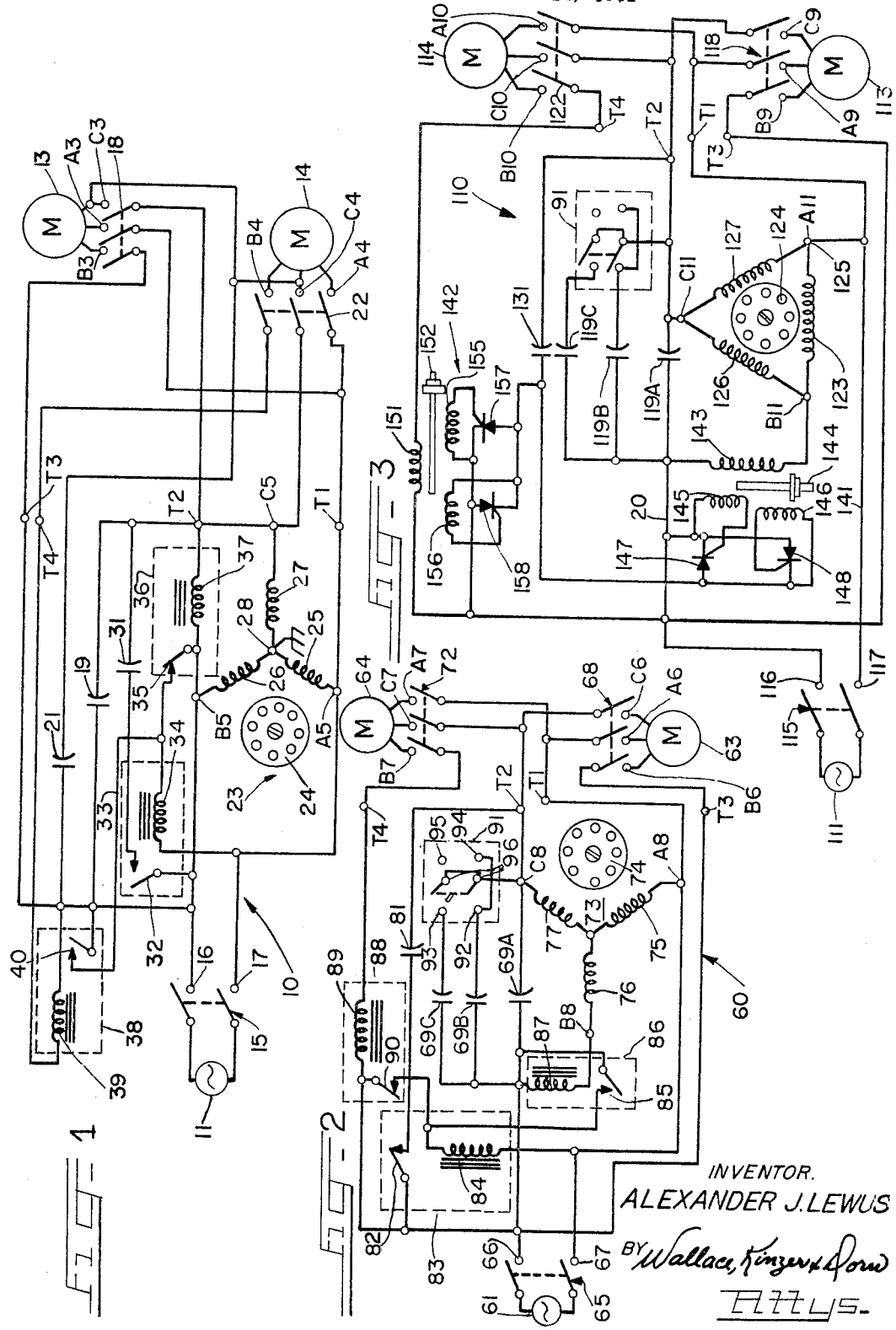
INVENTOR.
ALEXANDER J. LEWUS
BY Wallace, Kinzey & Korn
ATTYS.

United States Patent Office 3,271,646
Patented Sept. 6, 1966

3,271,646
CONVERTER SYSTEMS
Alexander J. Lewus, 1617 S. 47th Court, Cicero, Ill.
Filed July 12, 1965, Ser. No. 470,982
5 Claims. (Cl. 318—218)

This invention relates to converter systems and particularly to new and improved converter systems for energizing one or more three-phase motors or other three-phase loads from a single phase power supply. This application is a continuation-in-part of application Serial No. 379,765, now abandoned filed June 22, 1964, which was a division of application Serial No. 127,772, now abandoned filed June 14, 1961.

There are numerous applications in which it is necessary or desirable to utilize three-phase motors in the operation of different kinds of equipment without requiring provision of a three-phase power supply. The usual practice, under these circumstances, has been to employ a series capacitor in a relatively simple converter circuit. That is, two of the input terminals of a three-phase motor are connected directly to a single-phase power supply and the third input terminal of the motor is connected to one of the input lines through a relatively large high-voltage capacitor. A converter circuit of this kind, while relatively inexpensive, has several disadvantages in operation. For example, it can be shown that the currents in the three phases of a conventional motor can be balanced only for a power factor of 0.5, a condition that can be achieved, in most instances, only when the motor is very lightly loaded. Furthermore, the breakdown torque and starting torque for the motor are quite low with a conventional capacitor conversion circuit of this kind.

A variety of other proposals have previously been advanced with respect to conversion systems for operating three-phase motors and other three-phase loads from single-phase sources. For the most part, systems of this kind are balanced only for one particular load. Thus, if the system is balanced for approximate normal full load conditions, where a motor constitutes the load, the system will not provide starting and breakdown torques comparable to those afforded by the same motor or motors operating from a normal three-phase source.

Balancing difficulties are compounded when the converter system is required to energize a plurality of different three-phase motors (or other three-phase loads). The balancing of the system for a single load condition is of little avail when a variety of quite different load conditions may prevail, as is the case when even as few as two motors are energized independently of each other.

It is a principal object of the present invention, therefore, to provide a new and improved converter system for energizing a plurality of three-phase motors or other three-phase loads from a single-phase power supply.

A specific object of the invention is to obtain breakdown and pull-in torques comparable to those achieved in normal three-phase operation in a converter system that energizes two or more three-phase motors, independently of each other, from a single-phase power supply. In particular, it is an object of the present invention to afford a converter system that achieves high starting torques with smooth operation and permits utilization of the system for one, two or more three-phase motors subject to either light-duty or heavy-duty loading.

Another object of the invention is to achieve relatively high efficiency under overload conditions in a converter system employed to energize a plurality of three-phase loads from a single-phase supply.

A specific object of the invention is to provide a new and improved converter for energizing a three-phase motor or other three-phase load from a single-phase power supply employing a conventional induction motor as a rotary transformer.

Another object of the invention is to provide a new and improved converter system, using a conventional induction motor as a three-phase transformer, that provides for rapid and convenient internal modification to meet a variety of different load conditions created by multiple independently-operated three-phase loads.

A further object is to afford improved control characteristics in the switching of auxiliary de-phasing capacitors in a rotary converter system driving multiple three-phase loads.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a schematic diagram of a converter system constructed in accordance with one embodiment of the present invention;

FIG. 2 illustrates another embodiment of the present invention, similar to FIG. 1, but employing a different means for affording alternative connections for moderate duty and heavy duty operations; and FIG. 3 illustrates a converter system similar to FIG. 2 but employing a different form of rotary transformer and an improved form of control switching apparatus.

The converter system 10 that is illustrated in FIG. 1 comprises a first embodiment of the present invention. System 10 is employed to connect a single-phase power supply 11 to either of two independently operated motors 13 and 14, the latter being three-phase motors of any desired type. Power supply 11 is provided with the usual connecting switch 15, the output terminals of the power supply being identified by the reference numerals 16 and 17.

The operating circuit for motor 13 includes a three-pole starting switch 18 that affords individual operating connections to the three motor terminals A3, B3 and C3. Closing of switch 18 connects terminal B3 directly to the power supply terminal 16 and connects terminal A3 directly to the power supply terminal 17. On the other hand, switch 18 connects the third terminal C3 of motor 13 through a capacitor 19 to the power supply terminal 16, thus effectively connecting capacitor 19 across the motor termianls B3 and C3. In addition, terminal C3 is connected through a second capacitor 21 to the power supply terminal 16 in a circuit that is independent of the starting switch 18.

Motor 14 is also provided with a three-pole starting switch 22. Switch 22 can be closed to connect the motor terminal B4 to the power supply terminal 16 and to connect the terminal A4 to the other line terminal 17. The third terminal C4 of motor 14 is connected to the line terminal 16 through capacitor 21; this terminal is also connectable, upon closing of switch 22, to capacitor 19.

Converter system 10 includes a rotary transformer comprising an ordinary inductance motor 23 having a rotor 24 and three field windings 25, 26 and 27. The three field windings are disposed in a Y connection, being connected together at the common terminal 28, which may be grounded as shown. The end terminals of the three windings 25, 26 and 27 are designated as terminals A5, B5 and C5 respectively. The converter terminal B5 is connected to the one power supply terminal 16 and the terminal A5 is connected to the other line terminal 17. The third rotary transformer terminal C5 is connected through capacitor 19 to the line terminal 16.

Converter system 10 further includes a starting capacitor 31 that is connected in parallel with the main capacitor 19 in a circuit which includes, in series, the normally open contacts 32 of a voltage-sensitive control relay 33. The high-impedance operating coil 34 of this relay is connected across the line terminals 16 and 17 in an operating circuit that includes a pair of normally closed contacts 35 of a further potential-sensitive pilot relay 36. The high-impedance operating coil 37 of this relay is connected across the terminals B5 and C5 of the motor 23 that is used as a rotary transformer in the converter 10.

Converter 10 also includes an alternate control arrangement for energizing the operating coil 34 of the control relay 32. This circuit includes a second pilot relay 38 having an operating coil 39 that is connected in series with the circuit that connects the line terminal 16 to the pole of the switch 22 that contacts the motor terminal B4. Relay 38 is a current-sensitive device having a low-impedance operating coil. The relay includes a pair of normally-open contacts 40 that are connected in series in a circuit extending from the line terminal 16 to the operating coil 34 of the control relay 33.

To start converter 10, without regard to the two motors energized thereby, switch 15 is closed. Closing of this switch energizes the rotary transformer, motor 23. At starting, relay 33 is energized, closing contacts 32 and connecting the starting capacitor 31 in parallel with capacitor 19 in the operating circuit of motor 23. When the rotary transformer motor 23 builds up in speed, however, the resultant increase in voltage across terminals B5 and C5 actuates the voltage-sensitive pilot relay 36, opening its contacts 35. As a consequence, control relay 33 drops out and the starting capacitor 31 is disconnected from the circuit.

Starting of motor 13 is accomplished by closing switch 18. The motor is operated directly from the converter without utilization of the starting capacitor 31. Capacitors 19 and 21, however, are incorporated in the operating circuit of motor 13. This connection, to converter terminals T1, T2, and T3, is used for light-duty loads. If the motor 13 represents a very small load in comparison with that represented by motor 14, the fixed connection to capacitor 21 can be eliminated, utilizing only the main capacitor 19 of the converter in the circuit for motor 13.

Closing switch 22, on the other hand, starts the other load, motor 14. The initial inrush of starting current to this motor actuates the current-sensitive pilot relay 38, closing its contacts 40 and thereby completing an operating circuit for coil 34 of the control relay 33. This closes contacts 32 and connects the starting capacitor 31 in the operating circuit of motor 14 until that motor builds up speed. As motor 14 comes up in speed the current drawn by the motor reduces, relay 38 drops out, and capacitor 31 is again disconnected from the converter circuit. It is thus seen that motor 14, as connected to converter terminals T1, T2 and T4, is intended for heavy duty applications, in contrast with the connections illustrated for the motor 13 and employed for light and moderate duty.

FIG. 2 illustrates a converter system 60 comprising a second embodiment of the present invention. Converter system 60, which is generally similar in many respects to converter 10, comprises a conventional single-phase power supply 61 that is utilized to energize two independently operated three-phase motors 63 and 64. Motors 63 and 64 may be substantially different in size and may be different types of motors; thus, either motor may constitute a conventional squirrel cage conductor motor, a wound rotor motor, a synchronous motor, or any other three-phase motor. Power supply 61 is provided with the usual switch 65 for connecting the power supply to the converter, the output terminals of the power supply being identified by reference numerals 66 and 67.

Motor 63 includes the usual input terminals A6, B6 and C6 that are connected to the individual terminals of a three-pole motor starting switch 68. The terminal of switch 68 that affords a connection to motor terminal B6 is connected directly to the single-phase input terminal 66. The pole of switch 68 associated with motor terminal A6 is directly connected to power supply terminal 67. The third terminal C6 of motor 63 is connected through a capacitor 69A to the power supply terminal 66, so that capacitor 69A is effectively connected across motor terminal B6 and C6.

The circuit arrangement illustrated in FIG. 2, further includes a three-pole motor starting switch 72 for the second motor 64 that is energized from converter system 60. One end pole of switch 72, which connects to motor terminal A7, is connected directly to the power supply terminal 67. The other end pole of switch 72, associated with motor terminal B7, is connected to the supply terminal 66. The central pole of switch 72, which connects to motor terminal C7, is returned to power supply terminal 66 through a circuit that includes, in series, the capacitor 69A. Accordingly, capacitor 69A is effectively connected across motor terminals C7 and B7.

Converter 60 further includes a rotary transformer 73 constituting an ordinary squirrel cage inductance motor having a rotor 74 and three field windings 75, 76 and 77. As in the embodiment of FIG. 1, the field windings are Y-connected. The end terminals of the field windings 75, 76 and 77 are identified by reference characters A8, B8 and C8 respectively. Converter terminal A8 is connected to the power supply terminal 67. Terminal B8 is connected to the power supply terminal 66. To complete the converter circuit, capacitor 69A is connected between the rotary transformer terminals B8 and C8.

Converter 60 includes a starting capacitor 81 that is connected in parallel with capacitor 69A the main running capacitor of the converter system, in a circuit that includes, in series, the normally open contacts 82 of a voltage-sensitive control relay 83. Control relay 83 includes a high impedance operating coil 84 having one terminal connected to the power supply terminal 67. The other terminal of coil 84 is connected back to power supply terminal 66 through the normally open contacts 85 of a current-sensitive control relay 86. The operating coil 87 of control relay 86 is a low impedance coil, so that, upon closing of the contacts 85, the return circuit for coil 84 of relay 83 is effectively connected to the input terminal B8 of the rotary transformer 73. That is, the low impedance coil 87 of control relay 86 is connected in series with terminal B8 of the rotary transformer and hence in series with field winding 76 of the transformer.

Like the previously described converter 10, converter 60 (FIG. 2) is provided with an alternate control arrangement for energizing the control relay 83 in circuit with the starting capacitor 81. This alternate circuit comprises a current-sensitive pilot relay 88 having a low-impedance operating coil 89 and a pair of normally open contacts 90. Coil 89 is connected in series in the circuit from power supply terminal 66 to the left-hand pole of motor switch 72. One side of the normally open contacts 90 is connected to power supply terminal 66 and the other side of the contact pair is connected to the operating coil 84 of control relay 83.

Converter system 60 further includes two supplemental capacitors 69B and 69C that may be connected selectively in parallel with capacitor 69A by means of a selector switch 91. Selector switch 91 is a two-pole three-position device. One of the left-hand poles of selector switch 91 is connected to capacitor 69B, the capacitor being returned to power supply terminal 66. The other left-hand pole 93 of the selector switch is similarly connected to capacitor 69C, which is also returned to power supply terminal 66. One of the right-hand poles 94 of selector switch 91 is directly connected to pole 92 and hence is connected to capacitor 69B. The other right-hand pole 95 is left open-circuited. The two center poles 96 of the selector switch are electrically connected to each other, these being the poles terminally connected to the movable contacts of the switch.

In considering the operation of converter 60, it may first be assumed that selector switch 91 is in the position illustrated in FIG. 2, with the central movable contacts of the switch out of engagement with the end contacts 92–95. Under these circumstances, it is seen that capacitors 69B and 69C are not effectively connected to the converter circuit, since the only available circuit connection for these capacitors is through the central terminals 96 of selector switch 91 and the connection to terminal C8 of the rotary transformer 73. Thus, the initial operational description may be carried forward without regard to capacitors 69B and 69C.

To place the converter 60 in operation, switch 65 is closed, completing an operating circuit for the rotary transformer comprising motor 73. At starting, the large inrush current from power supply terminal 66 to terminal B8 of the rotary transformer actuates relay 86, closing contacts 85. This completes an operating circuit for coil 84 of relay 83, with the result that the contacts 82 are closed and starting capacitor 81 is effectively connected across terminals B8 and C8 of the rotary transformer. This circuit arrangement obtains until the rotary transformer approaches its normal operating speed (it should be noted that the rotary transformer, in all embodiments of the invention, operates under no load conditions). As the rotary transformer motor 73 comes up to speed, the current through its field winding 76 and through operating coil 87 of relay 86 diminishes sustantially, with the result that the relay drops out and contacts 85 open. The opening of contacts 85 breaks the operating circuit for coil 84 of relay 83, de-energizing that relay and permitting contacts 82 to return to their normally open condition. This opens the circuit to starting capacitor 81; accordingly, the starting capacitor is effectively disconnected from the converter circuit unless and until contacts 82 close at a subsequent time, as described hereinafter.

Starting of three-phase load represented by motor 63 is effected by closing switch 68. Motor 63, which is connected to converter terminals T1, T2 and T3, represents a light or moderate duty load that does not tend to cause a major phase imbalance in the converter operation when the load is first energized. Consequently, and with the circuit connection shown, the starting capacitor 81 of the converter system is not utilized in connection with the load 63. That is, with selector switch 91 in the position shown, the only de-phasing capacitor incorporated in the converter circuit and utilized in connection with motor 63 is the main capacitor 69A.

As in the previous embodiment, heavy duty load connections are made on converter terminals T1, T2 and T4. In this instance, the heavy duty connection is utilized for motor 64. Thus, upon closing of switch 72, the heavy inrush current required for starting motor 64 energizes relay 88, since the operating coil 89 of this relay is then connected in series from the motor terminal B7 back to the power supply terminal 66. Upon energization of the relay, by the starting current of the motor, contacts 90 close, again completing an operating circuit for control relay 83. As a consequence, the normally open contacts 82 of relay 83 close, connecting capacitor 81 in parallel with capacitor 69A across converter terminals T4 and hence across the motor terminals B7 and C7. The current to motor terminal B7 reduces as the motor comes up to speed, with the result that relay 88 drops out, contacts 90 open, and relay 83 drops out. This opens contacts 82 and again disconnects starting capacitor 81 from the operating circuit.

If converter system 60 is to be utilized over a wide range of different loads, it becomes virtually impossible to select a single main capacitor 69A that will afford adequate capacity over the entire load range. For example, if capacitor 69A is of a size adequate for operation of a one horsepower motor connected as shown for motor 63 and a two horsepower motor as load 64, substitution of a five horsepower motor for motor 64 may lead to an appreciable reduction in the voltage at the converter output terminal T2. The selector apparatus comprising capacitors 69B and 69C and selector switch 91 is utilized, in these instances, to add additional capacitance in parallel with capacitor 69A and thus increase the third phase voltage of the converter system for substantially increased loads.

For an initial moderate though substantial increase in load energized by converter system 60, selector switch 91 may be thrown to the right, connecting its center terminals 96 with terminals 94 and 95. With selector switch 91 in this position, capacitor 69B is effectively connected in parallel with the main capacitor 69A, but capacitor 69C is still left open-circuited. On the other hand, if a further substantial increment of load is required to be energized by converter 60, selector switch 91 may be thrown to its left-hand position to engage contacts 92 and 93 and connect those contacts to the center pulse 96 of the switch. With the selector switch thus actuated to its left-hand position, both of the capacitors 69B and 69C are connected in parallel with the main de-phasing capacitor 69A of the converter system. In this manner, converter system 69 provides an expanded range of operation, permitting use of the converter well beyond the initial range afforded by the basic circuit comprising capacitor 69A.

FIG. 3 illustrates a converter system 110 that is similar in many respects to the previously described converter systems 10 and 60 but which employs a slightly different winding arrangement for the rotary transformer and which incorporates completely different control devices instead of the current and voltage sensitive relays utilized in the previously described embodiments of the invention. Converter system 110 comprises the usual single phase A.C. supply 111 connected to a starting switch 115 having output terminals 116 and 117. Converter system 110 is shown as energizing a light or moderate duty motor or similar load 113 and a heavy duty motor load 114. The input terminals to motor 113 are identified by reference characters A9, B9 and C9 and the input terminals for motor 114 are marked as A10, B10 and C10. The starting switches for motors 113 and 114 are the switches 118 and 122 respectively.

The input terminals A9 of motor 113 is connected to the center pole of switch 118 which in turn is connected to the output terminal T1 of converter system 110 corresponding to the power supply input terminal 117. The terminal of switch 118 that contacts motor terminal B9 when the switch is closed is electrically connected to the power supply input terminal 116, which also corresponds to the output terminal T3 of the converter system. The remaining pole of switch 118, which is connectable to motor terminal C9, is connected to the converter output terminal T2 which in turn is coupled through a main capacitor 119A to the power supply input terminal 116.

The poles of motor switch 122 that connect to terminals A10, B10 and C10 of motor 114 are connected to converter system output terminals T1, T4 and T2 respectively. Thus, when the switch is closed, motor terminal A10 is effectively connected to the single phase power supply terminal 117, motor terminal B10 is connected to the single phase power supply terminal 116, and motor terminal C10 is coupled through capacitor 119A to power supply terminal 116.

Converter system 110 again includes a rotary transformer 123 that may comprise a conventional squirrel cage or other simple induction motor. In this instance, however, the field windings 125, 126 and 127 of the motor employed as a rotary transformer are connected in delta configuration. Thus, windings 125 and 127 are connected together at terminal A11. Windings 125 and 126 join at terminal B11, and windings 126 and 127 are connected together at terminal C11. Terminal A11 is connected to terminal 117 of the single phase power supply and terminal B11 is directly connected to the single phase power supply terminal 116. The main de-phasing capacitor 119A of the converter system is connected between terminals B11 and C11 of the rotary transformer.

As in converter 60, a selective apparatus is incorporated in converter 110 to provide for a substantial increase in the capacitance between the rotary transformer terminals C11 and B11 to compensate for substantial increases in the total load energized from the converter system. This selector apparatus is of similar construction to that described hereinabove and comprises two capacitors 119B and 119C that may be connected in parallel with capacitor 119A by means of the selector switch 91.

Converter system 110 further includes a starting capacitor 131 that is controlled to incorporate additional capacitance into the converter circuit for starting the rotary transformer motor 123 and for starting heavy duty loads connected to the converter terminals T1, T2 and T4 as exemplified by the motor 114. In this instance, however, the controls for automatically connecting and disconnecting the starting capacitor 131 from the converter circuit are substantially different from the relay arrangements described hereinabove in connection with FIGS. 1 and 2. Thus, one side of capacitor 131 is connected directly to the converter output terminal T2, and hence to the rotary transformer terminal C11. The other side of capacitor 131 may be connected, under different operating conditions described hereinafter, to the input terminal 116 and hence to rotary transformer terminal B11 by means of either one of two solid state control devices 141 and 142.

The first of the solid state control devices 141 comprises a current transformer having a low impedance primary winding 143 connected in series between the power supply input terminal 116 and the rotary transformer terminal B11. Primary winding 143 is coupled through an adjustable magnetic core 144 to two secondary windings 145 and 146.

Control device 141 further includes two signal-controlled semiconductor gate devices 147 and 148. Each of these devices may comprise a silicon signal-controlled rectifier (SCR) having input and output electrodes comprising an anode and a cathode and having a gate electrode for controlling conduction between the anode and cathode of the rectifier. The anode of the signal-controlled rectifier 147 is connected to capacitor 131 and a similar connection is made from the cathode of rectifier 148 to the starting capacitor. The cathode of rectifier 147 and the anode of rectifier 148 are each electrically connected to the power supply terminal 116. The gate electrode of rectifier 147 is connected to one terminal of the transformer secondary 145, the other terminal of secondary winding 145 being returned to the power supply terminal 116. The gate electrode of rectifier 148 is connected to one end of secondary winding 146, the other terminal of secondary winding 146 being connected back to capacitor 131. It is thus seen that the connections for the two signal-controlled rectifiers are generally similar but that the polarities are reversed.

A similar circuit arrangement is utilized for the second control device 142 employed in connection with starting capacitor 131. Thus, control device 142 comprises an input current transformer including a low-impedance primary winding 151 connected through an adjustable magnetic core 152 to two secondary windings 155 and 156. One terminal of secondary winding 155 is connected to the gate electrode of a first signal-controlled rectifier 157 and the other terminal of winding 155 is returned to the power supply terminal 116. The anode of rectifier 157 is connected to capacitor 131 and the cathode is connected to supply terminal 116.

A reversed polarity arrangement is used for secondary winding 156 and a second signal-controlled rectifier 158. Thus, one end of secondary winding 156 is connected to capacitor 131 and the other terminal of the transformer winding is connected to the gate electrode of the signal-controlled rectifier. The anode of rectifier 158 is connected to supply terminal 116. The cathode is connected to capacitor 131.

Assuming selector switch 91 is in its central position as shown in FIG. 3, capacitors 119B and 119C are not effectively connected in the converter circuit 110. Under these circumstances, these additional capacitors need not be considered in relation to the basic operation of the converter circuit.

To start the converter 110 in operation, switch 115 is closed. This provides an immediate direct connection from the power supply terminals 116 and 117 to the input terminals A11 and B11 of rotary transformer 123 and initiates an inrush of starting current to the rotary transformer which, it will be remembered, is simply a conventional induction motor operated at no load. The resulting heavy current through the primary winding 143 of the current transformer of control device 141 develops a control signal in the secondary windings 145 and 146 that is of sufficient amplitude to trrigger both of the signal-controlled rectifiers 147 and 148 to conductive condition. For each half-cycle of the supply voltage in which terminal 116 is driven positive with respect to terminal 117, a current pulse is supplied from the secondary winding 146 through the anode-cathode path in device 148 and through capacitor 131 to terminal C11 of the rotary transformer. On alternate half cycles, the current goes from the rotary transformer terminal C11 back through capacitor 131 and the anode-cathode path of rectifier 147 and through transformer secondary 145 to the primary winding of the transformer. It is thus seen that the capacitor 131 is effective connected in a complete starting circuit, through the two signal-controlled rectifiers 147 and 148, in parallel with the main capacitor 119A between the rotary transformer terminals C11 and B11.

As the rotary transformer, motor 123, builds up in E.M.F. and approaches its normal no load speed, the current drawn by the motor windings and passing through the primary winding 143 in the sensing transformer of control device 141 progressively reduces. When the current through primary winding 143 drops below a given threshold value, the amplitude of the control signals supplied from the secondary windings 145 and 146 to the gate electrodes of rectifiers 147 and 148 is no longer sufficient to trigger the rectifiers to conductive condition. Because the current in the anode-cathode path of each of the rectifiers 147 and 148 goes to zero in each cycle of the supply current, the signal-controlled rectifiers cease conduction and the starting capacitor 131 is effectively cut out of the circuit. It is thus seen that control device 141 completely replaces the combination of relays 33 and 36 in the embodiment of FIG. 1 and the corresponding combination 83 and 86 in the converter circuit of FIG. 2.

Upon closing of motor starting switch 118, the light duty or moderated duty load represented by motor 113 is connected to the converter terminals T1, T2 and T3 and is energized in the same manner as in the previous embodiment. For this light or moderate duty load, the starting capacitor is not used.

Upon closing of switch 122, however, the initial inrush current energizing motor 114 causes the sensing transformer of control device 152 to develop control signals in the secondary windings 155 and 156 having sufficient amplitude to cause both of the signal-controlled rectifiers 157 and 158 to conduct. With the rectifiers 157 and 158 in conductive condition, capacitor 131 is effectively connected across the rotary transformer terminals C11 and B11 in parallel with the main capacitor 119A. Thereafter, when the current drawn by the load 114 reduces, the control signals applied to the two rectifiers drop below a predetermined threshold value, the rectifiers return to their initial nonconductive state, and capacitor 131 is effectively disconnected from the operating circuit of the converter.

Selector 91 is utilized in the converter circuit 110 in the same manner as in converter circuit 60. Thus, if the load requirements of the converter system are increased substantially, the selector switch may be thrown to its right-hand position to connect auxiliary capacitor 119B in parallel with the main de-phasing capacitor 119A. A further substantial increase in load requirements may be met by actuating switch 91 to its left-hand position, connecting both of the capacitors 119B and 119C in parallel with capacitor 119A.

The operating voltages and currents for the motors or other three-phase loads actuated by the converter systems 10, 60 and 110 are closely balanced at full load conditions and are maintained within acceptable limits for starting and no load conditions. This is true even for substantial variations in the load, as when only a part of the load on any of the converters is in use. The full load power factors for the systems are high enough for virtually any applications, and can be held at high levels by adjustment of the main de-phasing capacitors by use of the switch 91 in systems 60 and 110. The full load efficiency is relatively high in all systems. In particular, the starting and breakdown torques, the power factor, and the efficiency are all substantially better than with conventional single-phase motors or conventional converter circuit arrangements for driving multiple three-phase motors from a single-phase source.

The rotors of the inexpensive inductance motors employed in the converter system as rotary transformers function as variable reactors. That is, the effective current-balancing inductance provided by the rotary transformer in each converter varies with changes in the load on the operating motor. Moreover, the rotary transformers afford a desirably high reactance/resistance ratio. As a consequence, the converter systems provide high breakdown and pull-in torques and a high service factor as compared with otherwise equivalent conversion arrangements.

In all instances, the converters of the present invention can be operated under substantial overload conditions without damage to the converter system. The voltage ratings of the capacitors employed need not be increased to double the line voltage or higher, as in conventional systems. Instead, capacitors rated for line voltage or only slightly higher can be used, materially reducing the cost of the converters. Provision is made for operation of both light duty and heavy duty motor loads, without changing the converter circuit.

The converter 110 of FIG. 3 eliminates all mechanical switching, materially reducing maintenance requirements for the system. Moreover, the speed of response is higher than for mechanical switching devices, yet positive control is afforded, easily adjustable to meet load requirements with respect to the use of the starting capacitor. In all embodiments, a single capacitor serves as a starting capacitor for the rotary transformer and for the heavy duty load. Because the rotary transformers are conventional mass-produced motors, costs are materially reduced as compared with any system requiring transformers specially constructed to fit system requirements.

Hence, while preferred embodiments of the invention have been described and illustrated it is to be understood that they are capable of variation and modification.

I claim:
1. A converter system for energizing a plurality of three-phase motors or like three-phase operating loads, each having three input terminals A, B and C, from a single-phase power supply having two output terminals, said converter system comprising:
   means for connecting a first one of said power supply output terminals to terminal A of each of said loads;
   means for connecting the other power supply output terminal to terminal B of each of said loads;
   a main de-phasing capacitor;
   means for connecting said main capacitor between terminals B and C of each of said loads;
   a three-phase rotary transformer having terminals A', B', and C';
   means for connecting said transformer terminals A', B' and C' to the terminals A, B and C, respectively, of each of said operating loads to afford a variable current-balancing inductance having a relatively high reactance-resistance ratio connected in parallel with the operating loads;
   a starting capacitor;
   means for automatically connecting said starting capacitor directly in parallel with said main capacitor upon initial energization of one of said loads and for disconnecting said starting capacitor when the load reaches normal operating conditions;
   and means for automatically connecting said starting capacitor directly in parallel with said main capacitor upon initial energization of said rotary transformer and for disconnecting said starting capacitor when the rotary transformer reaches normal operating conditions.

2. A converter system according to claim 1 in which said rotary transformer constitutes a conventional three-phase squirrel cage induction motor having three balanced field windings and operated under no-load conditions.

3. A converter system for energizing a plurality of three-phase motors or like three-phase operating loads, each having three input terminals A, B and C, from a single-phase power supply having two output terminals, said converter system comprising:
   means for connecting a first one of said power supply output terminals to terminal A of each of said loads;
   means for connecting the other power supply output terminal to terminal B of each of said loads;
   a main de-phasing capacitor;
   means for connecting said main capacitor between terminals B and C of each of said loads;
   a three-phase rotary transformer constituting a conventional three-phase induction motor including three balanced field windings having terminals A', B' and C';
   means for connecting said transformer terminals A', B' and C' to the terminals A, B and C, respectively, of each of said operating loads to afford an automatically variable current-balancing inductance having a relatively high reactance/resistance ratio connected in parallel with the operating loads;
   a starting capacitor;
   means for automatically connecting said starting capacitor in parallel with said main capacitor directly upon initial energization of at least one of said loads and for disconnecting said starting capacitor when the load reaches normal operating conditions;
   means for automatically connecting said starting capacitor directly in parallel with said main capacitor upon initial energization of said rotary transformer and for disconnecting said starting capacitor when the rotary transformer reaches normal operating conditions;
   at least one auxiliary de-phasing capacitor;
   and switch means for connecting said auxiliary capacitor directly in parallel with said main capacitor to increase the effective load range of the converter system without change in the rotary transformer.

4. A converter system for energizing a plurality of three-phase motors or like three-phase operating loads, each having three input terminals A, B and C, from a single-phase power supply having two output terminals, said converter system comprising:

means for connecting a first one of said power supply output terminals to terminal A of each of said loads;
means for connecting the other power supply output terminal to terminal B of each of said loads;
a main de-phasing capacitor;
means for connecting said main capacitor between terminals B and C of each of said loads;
a three-phase rotary transformer having terminals A', B' and C';
means for connecting said transformer terminals A', B' and C' to the terminals A, B and C, respectively, of each of said operating loads to afford an automatically variable current-balancing inductance having a relatively high reactance/resistance ratio connected in parallel with the operating load, in each instance;
a starting capacitor;
first control means for automatically connecting said starting capacitor directly in parallel with said main capacitor upon initial energization of one of said loads and for disconnecting said starting capacitor when the load reaches normal operating conditions;
and second control means for automatically connecting said starting capacitor directly in parallel with said main capacitor upon initial energization of said rotary transformer and for disconnecting said starting capacitor when the rotary transformer reaches normal operating conditions;
each of said control means comprising a sensing transformer having a primary winding connected to the energized apparatus, a secondary winding, and a signal-controlled semiconductor gate device having input and output electrodes connected in series with said starting capacitor and having a control electrode connected to said secondary winding.

5. A converter system for energizing a plurality of three-phase motors or like three-phase operating loads, each having three input terminals A, B and C, from a single-phase power supply having two output terminals, said converter system comprising:

means for connecting a first one of said power supply output terminals to terminal A of each of said loads;
means for connecting the other power supply output terminal to terminal B of each of said loads;
a main de-phasing capacitor;
means for connecting said main capacitor between terminals B and C of each of said loads;
a three-phase rotary transformer constituting a conventional squirrel cage three-phase induction motor operated at no load and including three balanced field windings having terminals A', B' and C';
means for connecting said transformer terminals A', B' and C' to the terminals A, B and C, respectively, of each of said operating loads to afford a variable current-balancing inductance having a relatively high reactance/resistance ratio connected in parallel with the operating load, in each instance;
a starting capacitor;
first control means for automatically connecting said starting capacitor directly in parallel with said main capacitor whenever the current to at least one of said loads exceeds a given threshold value and for disconnecting said starting capacitor whenever that current falls below the threshold;
second control means for automatically connecting said starting capacitor directly in parallel with said main capacitor upon initial energization of said rotary transformer and for disconnecting said starting capacitor when the rotary transformer reaches normal operating speed;
at least one auxiliary de-phasing capacitor;
and switch means for connecting said auxiliary capacitor directly in parallel with said main capacitor to increase the effective load range of the converter system without change in the rotary transformer;
each of said control means comprising a sensing transformer having a primary winding connected to the energized apparatus, a pair of secondary windings inductively coupled to the primary winding, and two signal-controlled semiconductor rectifiers each having anode and cathode electrodes connected in series with said starting capacitor, said rectifiers being connected in parallel but in opposed polarity, and each rectifier having a gate electrode connected to a respective one of said secondary windings.

References Cited by the Examiner

UNITED STATES PATENTS

| | | | |
|---|---|---|---|
| 641,903 | 1/1900 | Steinmetz | 318—220 XR |
| 2,832,925 | 4/1958 | Koll | 318—221 |
| 3,146,392 | 8/1964 | Sylvan. | |

ORIS L. RADER, *Primary Examiner.*

G. Z. RUBINSON, *Assistant Examiner.*